United States Patent [19]

Sontheimer et al.

[11] 4,371,118
[45] Feb. 1, 1983

[54] MAGNETIC SAFETY INTERLOCK METHOD AND APPARATUS FOR FOOD PROCESSOR

[75] Inventors: Carl G. Sontheimer, Greenwich, Conn.; Allen F. Podell, Palo Alto, Calif.

[73] Assignee: Cuisinarts, Inc., Greenwich, Conn.

[21] Appl. No.: 155,200

[22] Filed: Jun. 2, 1980

[51] Int. Cl.³ .............................................. B02C 18/16
[52] U.S. Cl. .................................... 241/30; 241/37.5; 241/92; 241/282.2; 361/203
[58] Field of Search .............. 241/36, 37.5, 92, 282.1, 241/282.2, 30, 199.12; 361/203

[56] References Cited

U.S. PATENT DOCUMENTS

| 3,892,365 | 7/1975 | Verdun | 241/37.5 X |
| 3,985,304 | 10/1976 | Sontheimer | 241/92 |
| 4,216,917 | 8/1980 | Clare et al. | 241/37.5 |

Primary Examiner—Mark Rosenbaum
Assistant Examiner—Timothy V. Eley
Attorney, Agent, or Firm—Parmelee, Bollinger & Bramblett

[57] ABSTRACT

Safety interlock method and apparatus employing magnetic effects for food processors having a base enclosing a motor drive, working bowl detachably mountable on the base for receiving various rotatable tools removably installable on drive means in the bowl, with removable cover for the bowl. Such food processors normally include a hopper or feed tube on the cover with manually operated pusher for feeding food items down it to the rotating tool. The safety interlock in one embodiment prevents actuation of the drive to prevent tool rotation unless two conditions are met: (1) the working bowl is in proper position and (2) the cover is in proper position. The safety interlock in another embodiment prevents actuation of the motor drive unless three conditions are met: (1) bowl in proper position, (2) cover in proper position, and (3) food pusher is inserted into the feed tube. If there is a relatively large feed tube, the user is thus prevented by the inserted food pusher from inadvertently inserting a hand or foreign object into it. By virtue of this latter interlock, the feed tube can safely be made of larger cross-sectional area so that larger food items can be inserted whole. Moreover, the entire size of working bowl, cover and feed tube can be proportionately enlarged for providing a larger overall machine. The various interlock systems employ magnetic effects advantageously in ways for increasing discrimination against inadvertent actuation by ordinary magnets.

33 Claims, 17 Drawing Figures

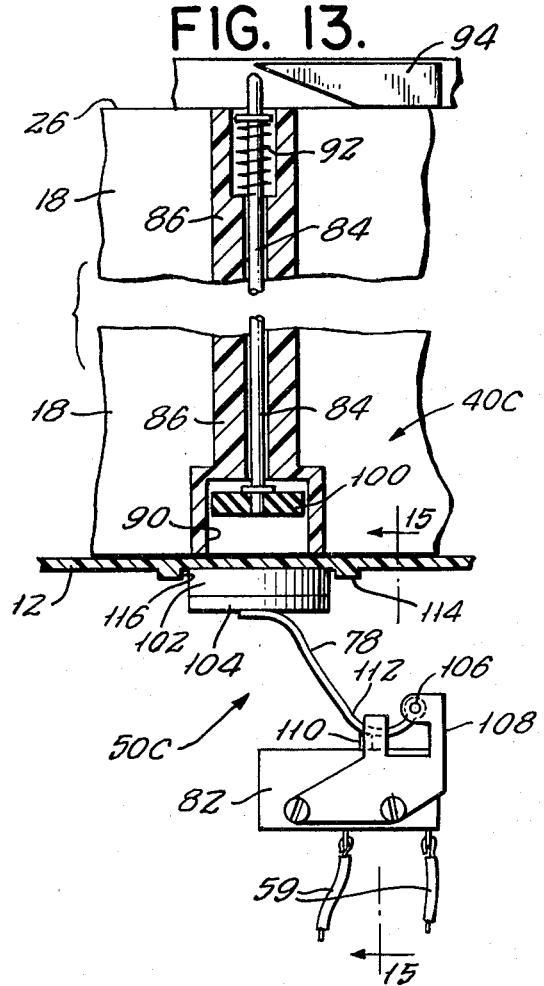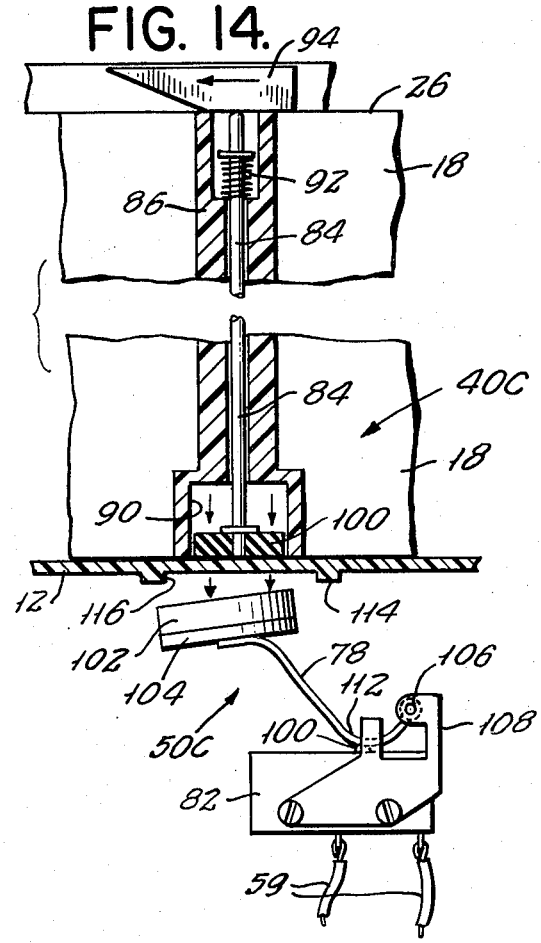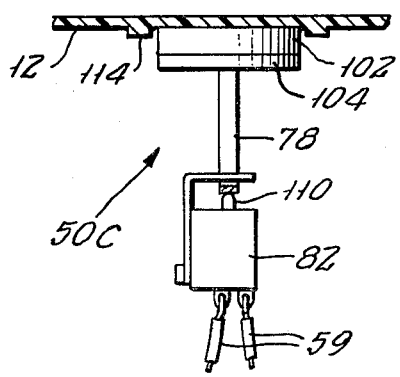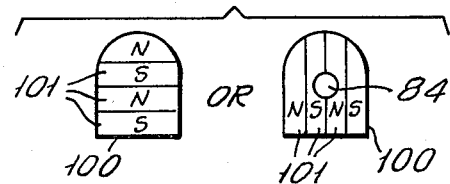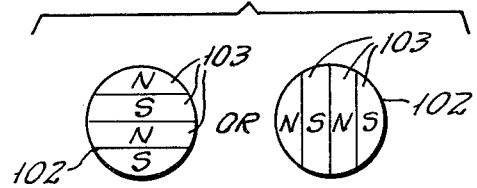

MAGNETIC SAFETY INTERLOCK METHOD AND APPARATUS FOR FOOD PROCESSOR

FIELD OF THE INVENTION

The present invention relates to apparatus for preparing food and, in particular, to the multipurpose kitchet apparatus called food processors in which a plurality of interchangeable rotary food preparing tools are removably mounted on a tool drive mount in a bowl, including a variety of tools such as cutting discs or blades, slicing discs, rasping discs, grating discs, grinding or chopping blades, etc., which are used for performing the operations of cutting, slicing, rasping, grating, pureeing, etc., of food items.

BACKGROUND OF THE INVENTION

There are food processors of the type broadly set forth above having a working bowl or vessel with a motor-driven tool-drive mount in the bowl on which various selected rotary tools can be engaged to be driven for performing various food processing operations, such as listed above, as may be desired by the user. A detachable cover is secured over the top of the bowl during use. This cover includes a hopper or feed tube which has a mouth that opens downwardly through the cover into the top of the bowl. The food items to be prepared are placed in this feed tube and then are manually pushed down through the feed tube into the bowl by means of a removable pusher member which is adapted to slide down in the manner of a plunger into this feed tube. For further information about this type of food preparing apparatus, the reader may refer to U.S. Pat. Nos. 3,892,365 to Verdun and 3,985,304 to Sontheimer.

The rotary tools in food processors are being driven by relatively powerful motor drive arrangements and have the capability of causing injury. For this reason, a mechanical interlock bowl-cover safety switch is conventionally incorporated into these units. This switch arrangement requires that the cover be firmly locked onto the bowl in normal position before the motor will start. This requirement is achieved by making the cover, which locks rotationally to the bowl, with a projection or member which causes the closing of the switch carried in the housing only when the cover is properly locked into its normal position on the bowl. Depending upon the type of food processor, this cover projection may actuate the switch directly or through an intermediate linkage.

Another safety feature is the provision of an upright food-receiving hopper having a feed passageway which extends down through the cover. This hopper is deliberately designed in terms of shape, moderate cross-sectional area of the food feed passageway and height to make it almost impossible for a normal adult inadvertently to insert a hand sufficiently far down into the hopper to touch the rotating tool located in the upper portion of the working bowl. In addition, the pusher is provided for feeding food items down into engagement with the food processing tool.

Such mechanically actuated switches require that a mechanical access port be provided through which a plunger or other projecting member can actuate the switch. This access port is usually covered by a recessed, flexible displaceable diaphragm for preventing food materials or liquids from entering the base housing. The user is faced with the need to keep the access port and the recessed surface of the diaphragm clean for aesthetic and sanitary reasons. Moreover, such a flexible, displaceable diaphragm may be subject to aging or deterioration over long periods of time, making it more difficult to clean or to operate.

Accordingly, it is an object of the present invention to provide a safety interlock for the bowl and cover, and in some cases for the food pusher as well, employing magnetic effects to prevent operation of the motor drive unless the components are properly mounted and firmly held in place and thereby avoiding the need for any mechanical access port in the base housing. Consequently, the food processor is neater in appearance and easier to clean and to maintain.

In employing magnetic effects to provide the desired safety interlock feature, we recognize that simple magnet arrangements are undesirable because of the widespread use of small magnets in many home kitchens. Such readily available magnets might be used inadvertently or intentionally to defeat a safety interlock based upon a simple scheme. Accordingly, we have provided various embodiments of the invention employing magnetic effects and each including discriminating means for increasing their discrimination against inadvertent or improper actuation by ordinary magnets.

SUMMARY

The invention is an improvement in an automatic food processor of the type including a relatively powerful electric motor drive mechanism within a base housing and having "ON" and "OFF" operating conditions for the motor drive. A working bowl is mountable on the housing and is adapted to have a rotatable tool removably installed on tool drive means in the bowl. This tool drive means is driven by the powerful motor in the base housing when the motor drive is operating. A removable cover for the bowl has a food-receiving hopper or feed tube with a passageway which extends down through the cover. A food pusher is manually insertable into the hopper for advancing food against a food processing tool in the working bowl. The improvement in one of its aspects utilizes magnetic means operatively associated with the cover and bowl which prevent the motor drive from operating to rotate the tool unless the bowl is located properly on the base housing and the cover is firmly locked or held on the bowl in normal position. The improvement in another of its aspects utilizes magnetic means in the food pusher, cover, and bowl for preventing the motor drive from operating to rotate the tool unless the bowl and cover are firmly mounted in place and the food pusher is inserted into the feed tube.

Among the advantages of this latter interlock are those resulting from the fact that the cross-sectional area of the food passageway in the feed tube can be made as large as may be desired, so that larger food items can be inserted whole into the food processor. As a result, the entire machine can now safely be scaled up to larger size for commercial and industrial applications, with corresponding enlargement of the cover and feed tube.

Each of the various interlock systems described advantageously employs magnetic effects and includes discriminating means for increasing their discrimination against inadvertent or improper actuation by ordinary magnets.

BRIEF DESCRIPTION OF THE DRAWINGS

The invention, together with further objects, features, aspects and advantages thereof, will be more clearly understood from a consideration of the following description taken in conjunction with the accompanying drawings in which like reference numerals indicate like parts or corresponding elements throughout the various views.

FIG. 12 is a perspective view of the magnetic apparatus shown in FIGS. 10 and 11;

FIGS. 13 and 14 illustrate a presently preferred permanent magnet actuated safety interlock including magnetically coded permanent magnets for discriminating against improper actuation;

FIG. 15 is a partial sectional view as seen along the line 15—15 in FIG. 13;

FIG. 16 is a bottom plan view of a movable upper permanent magnet showing the pattern of its magnetic coding; and FIG. 17 is a top plan view of a lower permanent magnet showing its magnetic coding pattern.

DESCRIPTION OF THE PREFERRED EMBODIMENTS

Figure 1:
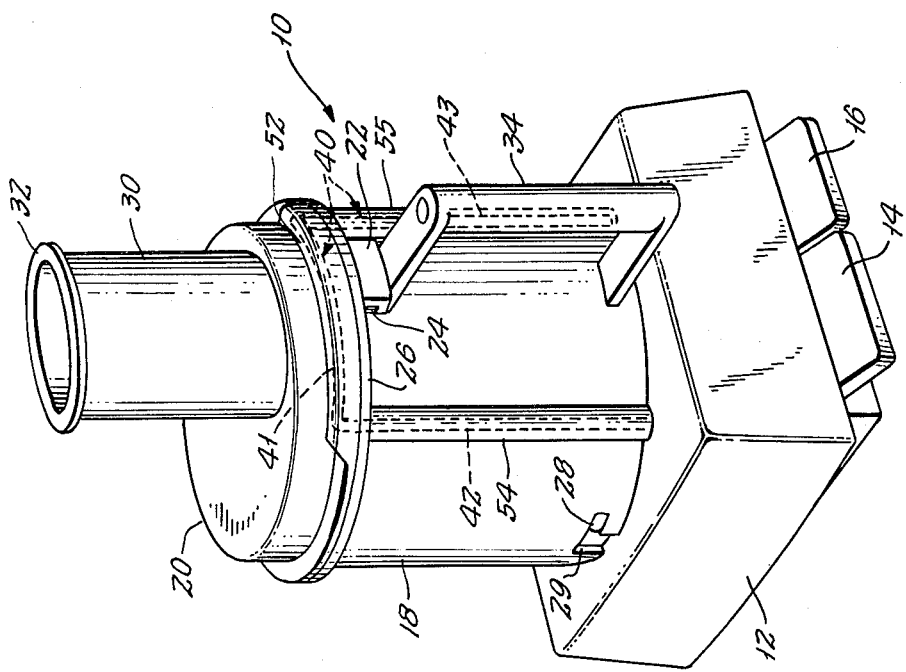
FIG. 1 is a front perspective view of a food processor embodying the safety interlock method and apparatus of the present invention for preventing actuation of the tool drive unless two conditions have been met, namely, (1) the working bowl is mounted in proper position on the base housing, and (2) the cover is in proper position on the bowl. This view is seen from in front and above the food processor.

Turning attention now to FIG. 1, a food processor referred to generally with the reference character 10, is illustrated having a base housing 12 with a removable working bowl 18 shown mounted thereon in operating position. The top of the bowl 18 is closed by a cover 20 which is arranged to be engaged in fastened or secured relationship in its normal operating position on the bowl 18, whenever the food processor 10 is to be in operation. Extending upwardly from the cover 20 is a food receiving hopper or feed tube 30 which opens downwardly through the cover 20. The feed tube 30 is designed to receive a food pusher 32 which is manually insertable in the manner of a plunger and is employed to push food items down into engagement with a rotating tool (not shown) mounted on tool mounting means (not shown) for rotation in the bowl 18.

As is more fully shown and described in the aforesaid Verdun patent, the housing 12 contains relatively powerful electric motor tool drive means 36 for driving tool mounting means which extend upwardly from the housing 12 into the interior of the working bowl 18. A variety of different types of food processing tools are provided which may be selectively mounted on such tool mounting means for rotation within the bowl 18. Since such food processing tools and the tool drive apparatus are conventional, one example of which is illustrated in said Verdun patent, they are not shown nor described in detail here.

Also, the Verdun patent shows one method of obtaining a securing engagement of the cover when it has been properly mounted on the bowl in the form of rim-mounted depending lugs 22 which upon a manual turning of the cover engage beneath a plurality of radial ledges 24 on the lip or rim 26 of the bowl 18 in the manner of a twist lock. Likewise, other suitable means may be used to secure or fasten the cover in place when properly positioned on the bowl such as are now being used on the various commercially available food processors.

Suitable fastening means 28, 29 are also provided for securing the bowl in proper position on the base 12. For example, there are shown lateral tenons 28 which engage in corresponding notches 29 provided in a skirt on the bottom of the bowl 18. Thus, the bowl is secured in position on the base by manually lowering and turning the bowl relative to the base for causing the tenons 28 to enter and engage within the respective notches 29. Other suitable bowl-securing means may be provided interengageable between the base 12 and bowl 18, such as are now being used on the various commercially available food processors. A handle 34 is provided on the bowl for convenience of the user.

Figure 2:
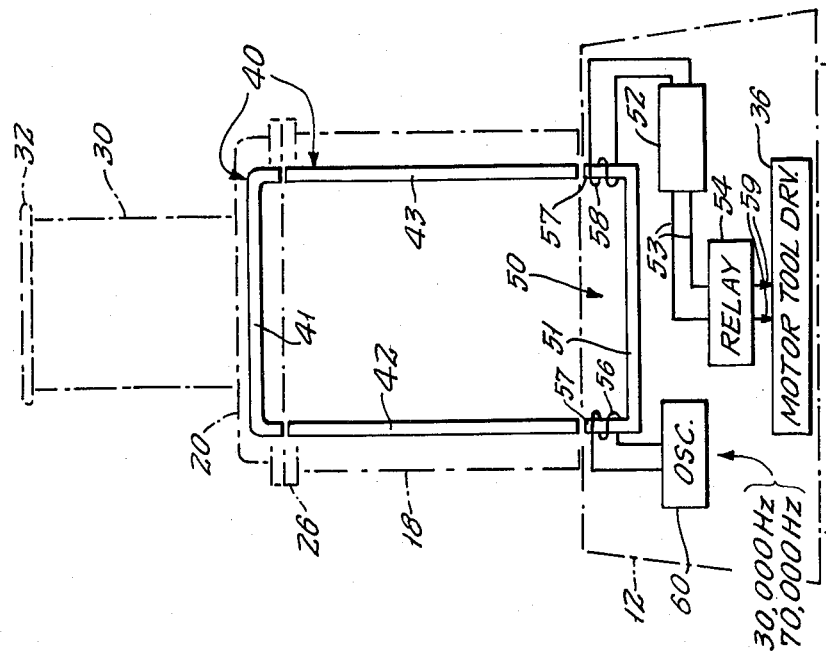
FIG. 2 is a schematic magnetic and electrical circuit diagram of the food processor of FIG. 1 for purposes of explanation of the ultrasonic frequency electromagnetic interlock.

Control levers or buttons 14 and 16 extend from the front of the base. The lever 14 turns "ON" and "OFF" the tool drive means 36, but this tool drive means will not actually operate unless the bowl and cover are properly positioned, as shown in FIGS. 1 and 2, as will be explained in detail further below. The lever 16 serves to "JOG" or "PULSE" the tool drive means 36 for producing brief momentary operation as may be desired by the user for particular food processing operations. Again, this lever 16 will not actually cause the tool drive means 36 to operate unless bowl and cover are in their proper positions. Such jogging or pulsing operation is known in the art and is not part of the present invention.

In order to prevent operation of the tool drive means 36 unless the bowl 18 and cover are both in their respective proper positions, there is provided first magnetic means 40 associated with the cover and with the bowl and second magnetic means 50 coupled with the control means 52. These first and second magnetic means serve for placing the tool drive means 36 in operative or inoperative condition. The control means 52 is connected by electrical leads 53 to a relay 54 which is included in the energizing circuit 59 of the tool drive means 36. Thus, this tool drive means 36 will not be operative until the relay 54 has been actuated into closed condition by the control 52.

The first magnetic means 40 and the second magnetic means 50 when they are positioned as shown in FIG. 2 define an essentially closed-loop magnetic circuit of very high magnetic permeability formed by elongated ferromagnetic members 41, 42, 43 and 51 having low hysteresis and low eddy current loss characteristics at ultrasonic frequencies. For example, these ferromagnetic members 41-43 and 51 may each comprise a bundle of numerous fine parallel wires of high quality, high frequency transformer iron which are electrically insulated one from another by individual varnish or enamel coating. Alternatively, these members 41-43 and 51 may each be formed of a ferromagnetic ceramic material, called ferrite, having low hysteresis and eddy current losses at ultrasonic frequencies. The magnetic member 41 has a broad U-shape and extends generally horizontally, being embedded in the front rim 52 of the plastic cover 20.

Figure 3:
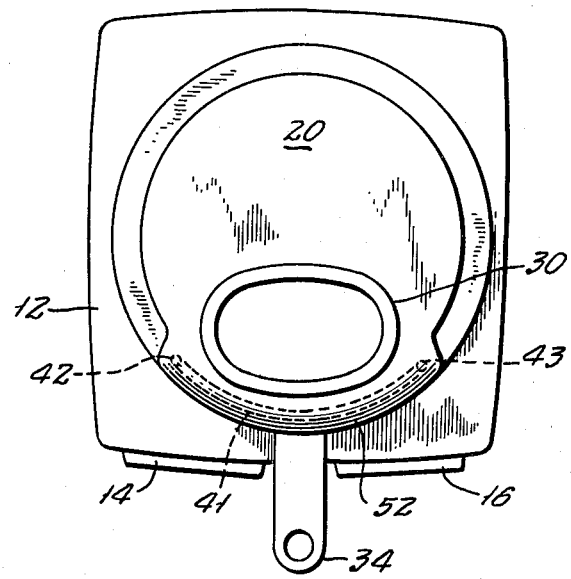
FIG. 3 is a top plan view of the food processor shown in FIG. 1.

As seen in FIG. 3, this magnetic member 41 has a significant curvature being shaped concentric with the circular plan of the cover and it is longer than the width of the feed tube 30. The front rim 52 of the cover is thickened in the region containing the member 41 to provide sufficient plastic material for conveniently embedding this member.

The two straight magnetic members 42 and 43 extend vertically and parallel and are embedded in the wall of the bowl 18 in elongated bosses 54 and 55, respectively, which are symmetrically positioned on opposite sides of the handle 34. When the cover is in proper position on the bowl, the ends of the member 41 are aligned with and closely adjacent to the upper ends of the two vertical members 42 and 43. Thus, there is a highly permeable path for magnetic flux provided by the first magnetic means 40, which includes the ferromagnetic members 41, 42 and 43 in series with each other as seen in FIG. 2.

The second magnetic means 50 is in the base housing 12 and includes the ferromagnetic member 51, which has a broad U-shape defining a pair of spaced vertical parallel legs 57, and includes the primary and secondary windings 56 and 58 located on its two leg portions 57. The two leg portions 57 of the ferromagnetic member 51 are aligned with and closely adjacent to the lower ends of the two members 42 and 43 when the bowl 18 is in operating position on the base 12 for completing the closed-loop magnetic circuit as seen in FIG. 2.

A source 60 of high frequency alternating current (A.C.), for example, an oscillator, generates an alternating electrical current having a predetermined ultrasonic frequency, for example, a fixed frequency in the range from 30,000 Hertz to 70,000 Hertz. This oscillator 60 is connected to the primary winding 56 for inducing ultrasonic A.C. magnetic flux in the magnetic loop circuit 51, 41-43.

Thus, there is ultrasonic A.C. magnetic flux in the ferromagnetic loop 51, 41-43 which, in turn, induces an A.C. voltage of the same ultrasonic frequency in the secondary winding 58, which is connected to the control 52. The secondary winding 58 may be called a pick-up winding. The control 52 includes a solid state amplifier for amplifying the A.C. signal voltage induced in the secondary winding 58, and a narrow band-pass filter or other frequency discriminating means tuned to be responsive only to the predetermined frequency of the oscillator 60. Also, included in the control 52 is a rectifier and filter capacitor connected to the output of the amplifier for supplying direct current (D.C.) over the wires 53 to the relay 54. Therefore, the control 52 descriminates against all signals except a signal voltage of predetermined frequency from the oscillator 60, and will actuate the relay 54 for placing the tool drive 36 in operative condition only when the bowl and cover are in proper operating position.

If both the cover and bowl are not in their respective proper operating positions, then the high permeability magnetic circuit 51, 41-43 for the flux is not closed, resulting in a greatly increased magnetic reluctance, so that only an insignificant amount of the ultrasonic A.C. magnetic flux from the primary winding 56 couples with the secondary winding 58. Therefore, the control 52 does not actuate the relay 54, and the tool drive 36 remains inoperative.

Figure 4:
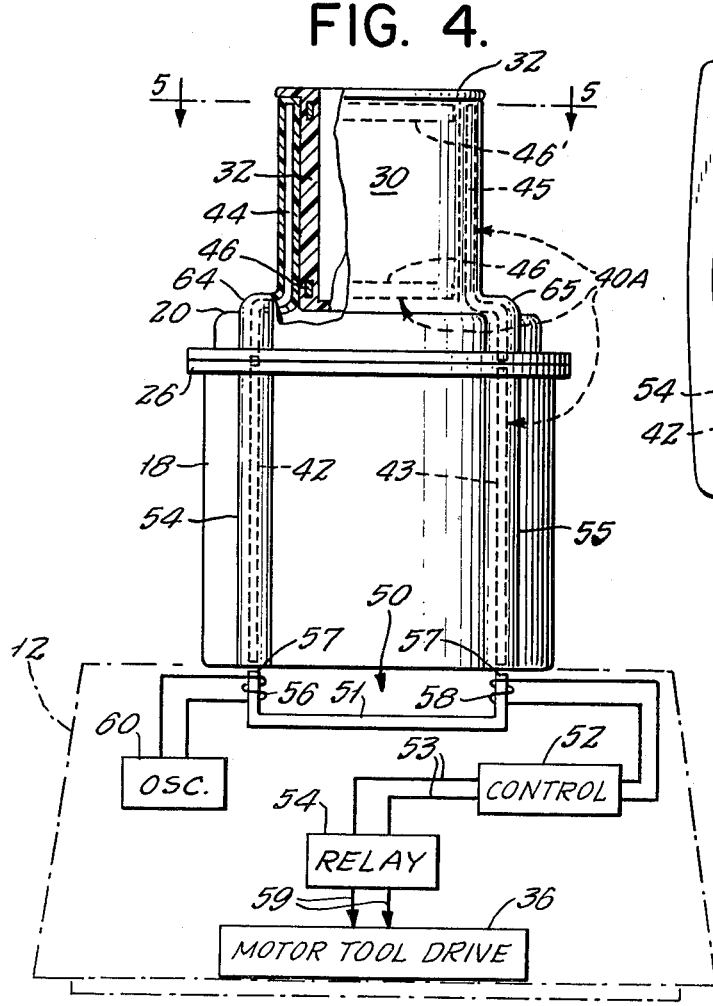
FIG. 4 is a front elevational view of portions of a food processor including a schematic magnetic and electrical circuit diagram of modified safety interlock method and apparatus similar to that shown in FIGS. 1, 2 and 3, except that in this modification actuation of the tool drive is prevented unless three conditions have been met, namely, the same two as above, plus (3) the food pusher is inserted into the feed tube in the cover. Part of FIG. 4 is shown in section.
Figure 5:
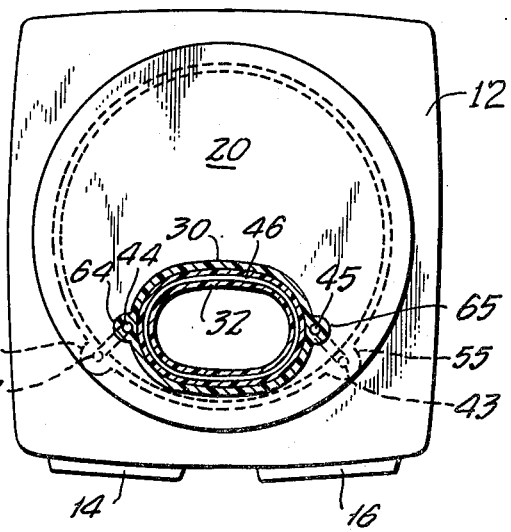
FIG. 5 is a top plan view of the apparatus shown in FIG. 4 with the feed tube being shown in section.

The magnetic interlock method and apparatus shown in FIGS. 4 and 5 is similar to that as described for FIGS. 1, 2 and 3, except that the first magnetic means 40A is also associated with the feed tube 30 and with the plunger 32 as well as being associated with the bowl and cover. In addition to the ferromagnetic members 42 and 43 embedded in the wall of the bowl 18, as described above, there are a pair of upper ferromagnetic members 44 and 45 whose lower ends are aligned with and closely adjacent to the upper ends of the ferromagnetic members 42 and 43. These upper members 44 and 45 are embedded in elongated bosses 64 and 65, respectively, on the cover and extending up along opposite sides of the feed tube 30.

In order to complete the closed-loop magnetic circuit, there is a horizontally extending ferromagnetic member 46 embedded in the food pusher 32 in a location where it effectively bridges across between the upper ferromagnetic members 44 and 45 whenever the food pusher 32 is inserted into the feed tube 30. If the food pusher 32 is of solid construction, then this horizontal member 46 can extend straight across the pusher from one side to the other near the bottom of the pusher as apparently seen toward the right side of the pusher in FIG. 4.

In most instances the food pusher 32 is hollow, having a bottom, side walls and a top rim, thereby being generally of cup-shaped configuration. Consequently, the horizontal ferromagnetic member 46 is hoop-shaped, as seen in FIG. 5 and as shown at the left in FIG. 4, so that it is embedded in the side wall of the pusher near the bottom of the pusher.

Whenever the food pusher 32 has been inserted into the feed tube 30, with the bowl and cover in their proper operating positions, as seen in FIG. 4, then the closed-loop magnetic circuit is established so that the ultrasonic A.C. magnetic flux from the primary winding 56 couples with the secondary winding 58, causing the control 52 to actuate the relay 54 for placing the tool drive 36 in operative condition. Even when the food pusher is only slightly inserted into the feed tube, the horizontal ferromagnetic member effectively bridges across between the vertical members 44 and 45 in the wall of the feed tube as shown at 46' because the member 46 is close to the lower end of the food pusher.

If the bowl, cover, and food pusher are not all in their respective proper operating positions, there is only an insignificant amount of magnetic flux coupling with the secondary winding 58. Therefore, the control 52 does not actuate the relay 54, and the tool drive 36 remains inoperative.

Figure 6:
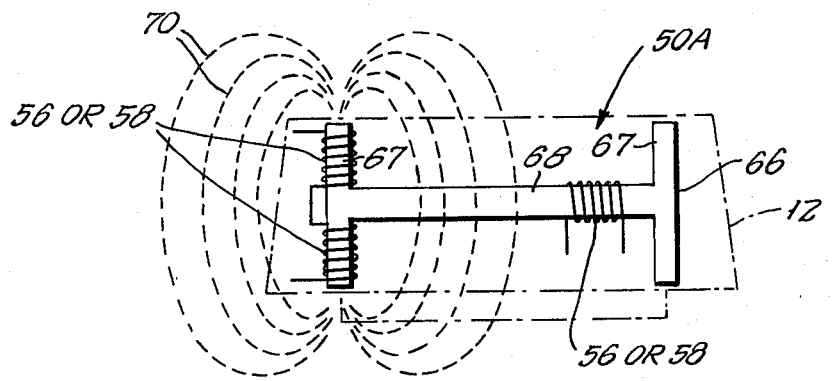
FIG. 6 shows part of modified magnetically actuated control means for rendering the tool drive operative or inoperative, employing A.C. electromagnetic effects.

In order to increase the sensitivity for distinguishing whether the ferromagnetic circuit is closed as shown in FIGS. 2 and 4, or whether it is open as a result of improper positioning of the food processor components, as described above, the second magnetic means 50A (FIG. 6) in the base housing 12 includes a ferromagnetic member 66 having a broad H-shape as seen in FIG. 6. Either the primary or secondary winding 56 or 58 is wound onto one of the vertical legs 67 with half of this winding being above and half being below the horizontal cross bar 68 of the H-shaped ferromagnetic core 66. The other winding 58 or 56 (secondary or primary, as the case may be) is placed on the horizontal cross bar 68 as far as possible from the leg 67 which contains the first winding. By virtue of the fact that the axes of the primary and secondary windings on the ferromagnetic core 66 are orthogonal to each other, there is normally a very small coefficient of coupling between these two windings, as indicated by the mutually uncoupled magnetic flux lines 70 (FIG. 6). However, whenever the magnetic circuit between the upper ends of the core legs 67 is completed by proper positioning of the components of the food processor, as shown in FIGS. 7 or 8, then a significant electromagnetic coupling is established between primary and secondary windings, as shown by the flux lines 70', so that the tool drive means is rendered operative.

Figure 7:
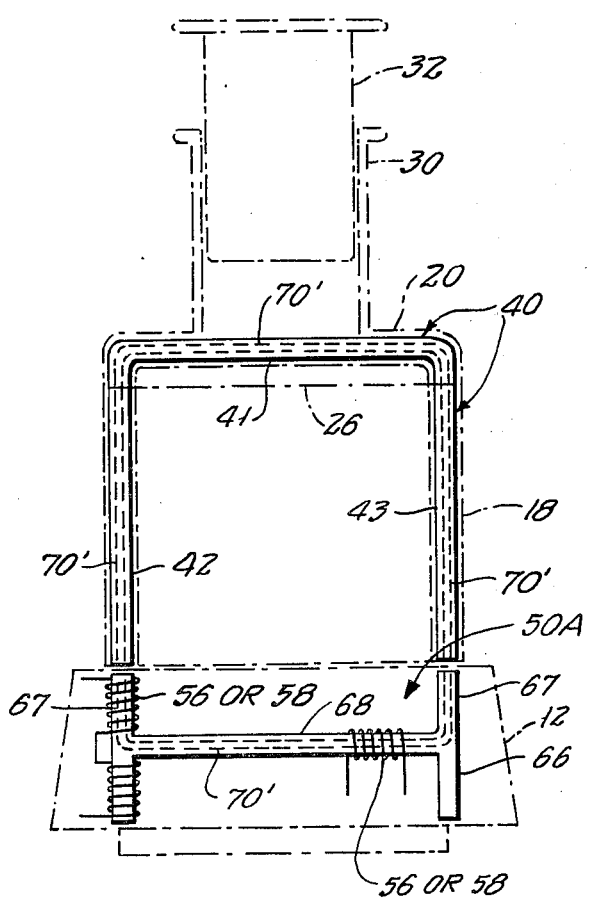
FIG. 7 shows the control means of FIG. 6 employed in the system of FIGS. 1, 2 and 3.
Figure 8:
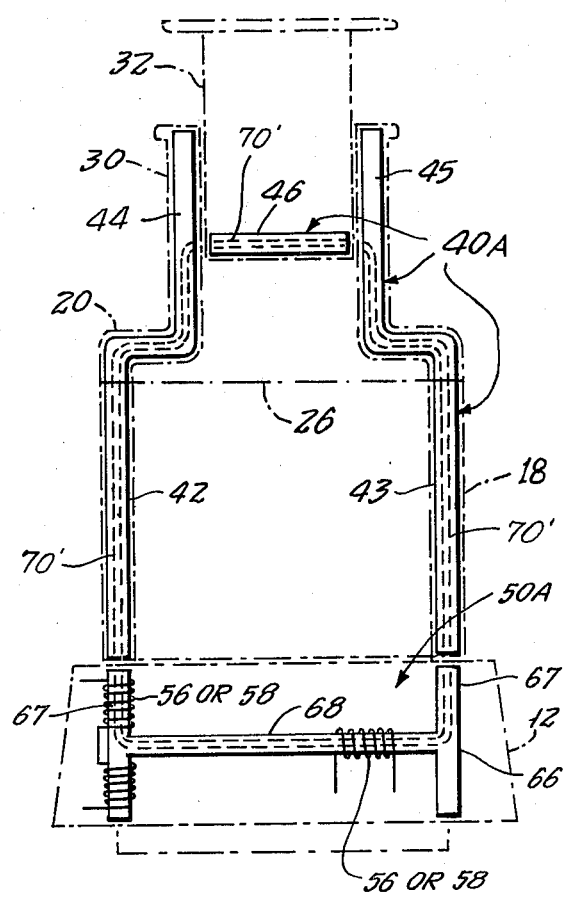
FIG. 8 shows the control means of FIG. 6 employed in the system of FIGS. 4 and 5.

It is to be understood that whichever winding is the primary winding in FIGS. 7 and 8 is energized by an oscillator (similar to the showing in FIGS. 2 and 4), while the secondary or pick-up winding is connected to a control as shown in FIGS. 2 and 4 for rendering the tool drive operative or inoperative.

Figure 9:
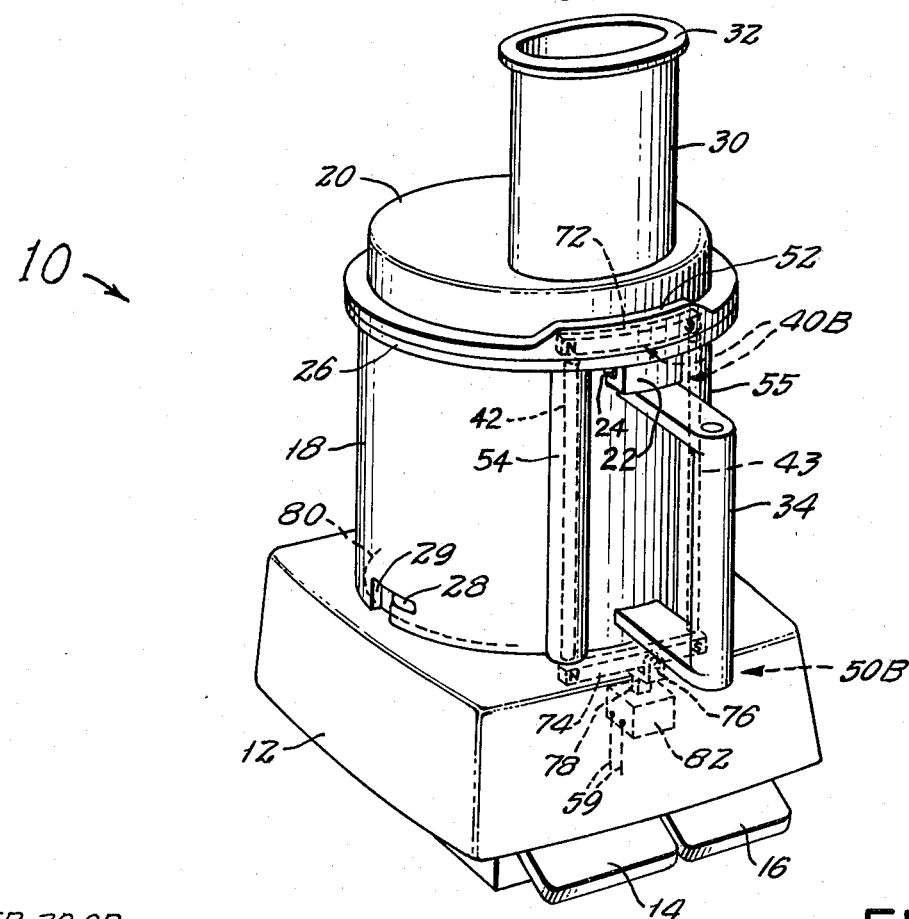
FIG. 9 is a perspective view of a food processor employing a permanent magnet actuated safety interlock system, including discrimination against improper actuation by an ordinary permanent magnet.

In FIG. 9 the first magnetic means 40B associated with the cover 20 and bowl 18 includes a curved permanent magnet 72 embedded in the enlarged front rim 52 of the cover 20 and two vertical parallel ferromagnetic members 42 and 43 embedded in the walls of the bowl similar to those previously described. The second magnetic means 50B includes another permanent magnet 74 pivoted at 76 at its center to a clevis at the upper end of the actuating arm 78 of a tool drive control switch 82. This normally open control switch 82 is connected to the tool drive energizing circuit 59 (FIGS. 2 and 4) and renders the tool drive 36 operative only when this switch 82 is closed by depressing its actuating arm 78 against the spring force of the switch.

When the cover and bowl are in their proper operating positions the first permanent magnet 72 repels the second permanent magnet 74 for depressing the upwardly spring-biased actuating arm 78, thereby closing the control switch 82 for rendering the tool drive operative. By virtue of the fact that the magnet 74 is pivoted at 76, it does not depress the switch actuating arm 78 unless the downward acting repulsive forces exerted at its two ends are equal. Therefore, this pivot mounting 76 serves as discriminating means for preventing the switch 82 from being inadvertently or intentionally actuated by a kitchen magnet. Moreover, the two ends of the magnet 74 are relatively widely spaced, which further reduces the possibility of actuation of the switch by a kitchen magnet, which is usually of relatively small size.

Figure 10:
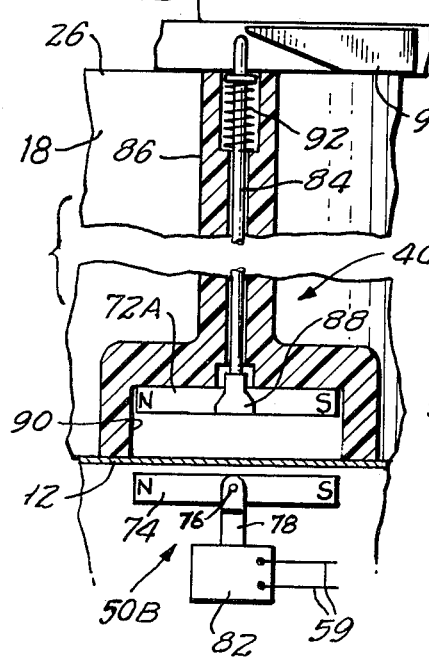
FIGS. 10 through 12 illustrate another permanent magnet actuated safety interlock having discrimination against improper actuation by an ordinary permanent magnet.
Figure 11:
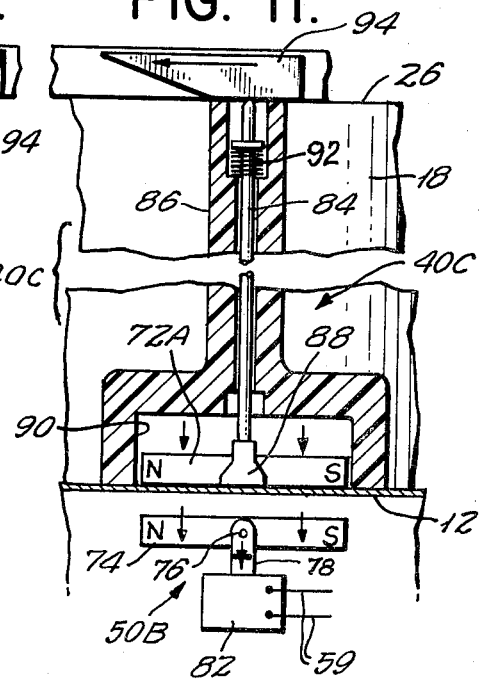
Figure 12:
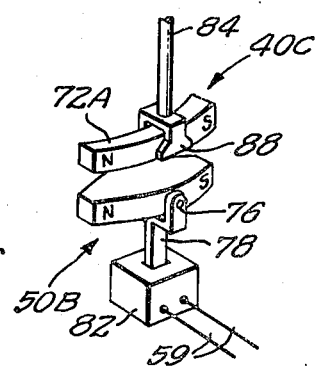

In the interlock method and apparatus as shown in FIGS. 10-12, the bowl 18 is equipped with a vertically movable actuating rod 84 located within a vertical semicylindrical boss 86 formed on the wall of the bowl. This vertically movable rod 84 and the enclosing boss 86 are similar to those shown in the Verdun U.S. Pat. No. 3,892,365. Attached to the lower end of this rod 84 by a bracket 88 is a permanent magnet 72A. An enlarged socket 90 is provided at the lower end of the boss 86 for housing the magnet 72A. A spring 92 normally urges the rod 84 toward its upper position, as shown in FIG. 10.

When the cover 20 is placed on the rim 26 of the bowl 18 and is turned into its proper operating position, a cam 94 on the rim of the cover depresses the actuating rod 84, as shown in FIG. 11, thereby moving the magnet 72A down against the upper surface of the base housing 12 directly above a pivoted magnet 74. This pivoted magnet 74 is repelled by the downwardly moving magnet 74A. Thus, the switch actuating arm 78 is depressed for closing the normally-open control switch 82, thereby placing the tool drive means 36 in operative condition. The first magnet means 40C in FIGS. 10-12 includes the magnet 72A and its associated actuator rod 84.

Again, it is noted that the magnet 72A is pivoted at 76 at its center for discriminating against inadvertent or intentional actuation of the switch 82 by an ordinary kitchen magnet. As before, it is noted that the ends of the magnet 74 are relatively widely spaced from each other which makes the inadvertent or intentional actuation of the switch 82 by an ordinary magnet more difficult.

Furthermore, it is noted that the base housing 12 includes a circular turret or elevated platform shown dotted at 80 of a diameter slightly less than the diameter of the bowl 18. The lower skirt of the bowl 18 seats down around this raised platform. Such a raised platform is not shown in in any of the drawings, but the configuration of the top surface of the base housing 12, including a circular bowl-mounting platform, is clearly shown in said Verdun patent.

The two ends of the permanent magnet 74 (in FIGS. 10, 11 and also in FIG. 9) are positioned beneath the top of the housing 12 near to the periphery of this raised circular platform. Consequently, it is not possible for the opposite ends of an ordinary straight bar magnet to be placed simultaneously directly above the opposite ends of the magnet 74 because of interference with the curved periphery of the raised platform. As shown in FIG. 12, the magnet 72A is curved concentric with the periphery of the raised platform to provide clearance so that its opposite ends can be positioned directly above the opposite ends of the pivoted magnet 74 for depressing the latter magnet against the force of the spring means in the normally-open control switch 82.

It is to be noted that this condition of the raised platform interfering with simultaneous access by any straight magnet or bar to the regions on the base housing 12 directly above the opposite legs 57, 57 or 67, 67 in FIGS. 2, 4, 7 and 8 is also true, thereby providing further discrimination against inadvertent or intentional actuation of the tool drive control means, except by the intended proper positioning of the respective components of the food processor in their respective operating positions as described above.

In the preceding description, the cam 94 is described as being located on the rim of the cover 20. In an alternative arrangement which is now commercially available in the market, the cam 94 is located on a protective outer sleeve which slides down around the feed tube 30. This outer sleeve contains a movable food pusher which is captivated within the sleeve for assuring that the food pusher is located within the feed tube before the food processor is operated. Therefore, it is to be understood that the cam 94, as shown in FIGS. 10 and 11 may be located upon the cover or may be located upon such a protective feed-tube sleeve associated with the feed tube cover, as is indicated by the legend in FIG. 10.

Although the spring 92 in FIGS. 10 and 11 is shown near the upper end of the movable rod 84 for convenience of illustration, it is to be understood that this spring may be located lower down in the boss 86, for example, as shown in the Verdun patent.

In the interlock method and apparatus as shown in FIGS. 13 through 17, the bowl 18 is equipped with a vertically movable actuating rod 84 similar to that as described in connection with FIGS. 10 through 12. Attached by adhesive cement to the lower end of this rod 84 is a coded rubber magnet 100, the shape of which is shown in FIG. 16. As shown in FIG. 16, this rubber magnet 100 includes alternating stripes each approximately one-eighth of an inch wide of north, south, north, south polarity. Positioned beneath and closely adjacent to the top surface of the base housing 12 is another coded rubber magnet 102 of circular configuration cemented onto a soft iron disk 104. This ferromagnetic disk is soldered to the upper outer end of a movable actuating arm 78 of a tool drive control switch 82. This movable arm 78 is pivoted at 106 to a bracket 108 mounted upon the casing of the switch 82. The switch 82 is normally open and has an actuator button 110 which is spring-biased upwardly and is located beneath an elbow 112 of the arm 78 near the pivot 106. Thus, the arm 78 as an overall configuration of a lever of the second class, with the fulcrum being located at the pivot 106, thereby providing mechanical advantage for depressing the button 110 against the spring force of the switch 82. The switch 82 as shown is a small switch of the type commercially available under the designation "MicroSwitch", in which a relatively short downward stroke of the button 110 will close the contacts in this normally open switch.

FIG. 17 shows the alternating north, south, north, south polarity stripes in the coded rubber magnet 102. As shown in FIG. 14, when the cover 20 or the feed-tube sleeve, as described above, is turned into operating position relative to the bowl 18, the cam 94 depresses the actuating rod 84, thereby moving the coded magnet 100 down against the top surface of the base housing 12. By virtue of the fact that the coded magnetic polarity stripes 101 in the upper magnet 100 are oriented parallel with the corresponding magnetic polarity stripes 103 in the lower magnet 102, and the respective stripes of like polarity are positioned directly above the corresponding like-polarity stripes 103 in the lower magnet, the upper magnet 100 repels the lower magnet 102 causing the arm 78 to swing downwardly as shown in FIG. 14. Thus, the button 110 is depressed, and the contacts in the switch 82 become closed for completing the energization circuit 59 of the tool drive means 36 (FIGS. 2 and 4).

The coded striping 101 and 103 in the rubber magnets 100 and 102 serve as discriminating means for preventing inadvertent or intentional actuation of the switch 82 by an ordinary magnet. Such coded rubber magnets 100 and 102 are relatively powerful in spite of their thin configuration. The coded rubber magnet material is commercially available in sheet strip form, and the sheet can conveniently be cut and shaped with a penknife. The rubber magnet sheet is approximately one-eighth of an inch thick. The soft iron disk 104 is approximately one-sixteenth of an inch thick and effectively provides a high permeability medium directly below the lower magnet 102 for conducting magnetic flux, thereby increasing the effective strength of this lower magnet 102. Note that the magnets are chosen anti-symmetric (NSNS). Therefore, only at 0° (proper alignment) relative rotation of the top magnet with respect to the bottom magnet can the switch be actuated. If an attempt is made to place an ordinary magnet on the top surface of the base housing 12 above the lower magnet the result is to attract, not to repel, this lower magnet, and so the switch 82 is not closed, and the tool drive means 36 remains inoperative.

Advantageously, each of the embodiments of the present invention described above, enables the top surface of the base housing 12 to be smooth, without any aperture or access port as is provided in commercially available food processors currently on the market. This housing 12 is of plastic, which is premeable to magnetic flux, and therefore the magnetic flux will pass through it as described. This avoidance of an aperture or an access port in the upper surface of the base housing 12 provides an overall sleek, neat appearance and facilitates cleaning of the food processor, since there is no discontinuity in the surface in which food particles can become lodged.

It is to be noted that the energization circuit 59 (FIGS. 2, 4, 9–14) may serve to control the energization of the electric motor in the base housing 12 of the food processor for rendering the motor drive operative for driving a tool in the bowl 18. Alternatively, this energization circuit 59 may serve to control the operation of a clutch in the motor drive for rendering the tool drive operative for driving a tool in the bowl 18. In other words, the motor itself may be turned on by a different switch, and then a clutch must be actuated by the control means before the tool in the bowl 18 becomes driven by the motor. Therefore, the terms "control means" and "tool drive means" are intended to be interpreted sufficiently broadly to include either of these control arrangements for rendering the tool drive operative and inoperative.

It is also to be noted that in the embodiments of this invention which have been described, the second magnet means 50, 50A, 50B, 50C and the associated tool drive control means are located within the base housing 12 at a lower level than the bottom of the bowl 18. There are food processors in use today in which a motor control switch is located in an elevated position in an upstanding portion of the base housing 12 adjacent to the rim of the bowl 18 and the cover 20. It is to be understood that the second magnet means 50, 50A, 50B, 50C can be positioned in such an elevated for upstanding portion of the base housing, with an appropriate reconfiguration of the first magnet means 40, 40A, 40B, 40C for actuating the tool drive control means when the components, as described, are in their respective proper operating positions.

In FIG. 13 the plastic housing has a depending annular ridge 114 forming a wide shallow socket 116 on the under surface of the base housing 12 into which the lower magnet 102 fits with clearance. This socket 116 in effect steers the lower magnet 102 into a predetermined accurate position below the housing surface 12 in spite of moderate tolerance in movement of the outer end of the actuating arm 78.

There is another advantage in eliminating the aperture or access port in the base housing. In order to understand this advantage, it is helpful first to understand the operation of prior art food processors having such an access port. An actuating rod on the bowl as shown in said Verdun patent is caused to enter the access port for actuating a switch in the machine base below the port. This actuating rod becomes depressed into the port when the cover is twist-locked into operating position on the bowl. Therefore, the bowl must first be properly positioned on the base with the actuating rod directly aligned with the port before the cover can be twist-locked onto the bowl. An attempt to twist-lock the cover in operation position on the bowl before the bowl is placed on the machine base will cause the actuating rod to become depressed, and its downwardly projecting lower end will thereafter interfere with an attempt to mount the bowl on the machine base. Any of the interlock methods and apparatus as described herein enable either the bowl or the cover to be mounted first.

If desired by the user, the cover can be mounted on the bowl before the bowl is mounted upon the base 12. Therefore, the user has greater flexibility in the procedures of handling the bowl and cover components of the food processor, because an actuating rod does not need to be aligned with an access port before it is depressed.

As shown at the right in FIGS. 16 and 17, the magnetic polarity stripes 101 and 103 in the upper and lower permanent magnets 100 and 102 all extend in a direction perpendicular to a vertical plane tangent to the circular cylindrical wall of the bowl 18 in the region where the upper magnet 100 is located. Thus, the orientation of these magnetic stripes is perpendicular to the twist-lock turning movement applied by the user to the bowl in engaging the bowl notches 29 on the tenons 28. Therefore, the orientation of these magnetic stripes also provides discrimination for assuring that the bowl has been fully turned into its proper operating position on the base, because only then will like-polarity stripes on the upper magnet be directly aligned with and registered with like-polarity stripes on the lower magnet for exerting a powerful repelling force for depressing the switch actuating arm 78 as shown in FIG. 14.

Since other changes and modifications varied to fit particular food processor operating requirements and environments will be apparent to those skilled in the art, the invention is not considered limited to the examples chosen for purposes of illustration, and includes all changes and modifications which do not constitute a departure from the true spirit and scope of this invention as defined by the following claims and equivalents thereof.

We claim:
1. In a food processor of the type including tool drive means located in a base with control means for rendering the tool drive inoperative unless said control means is actuated, a bowl mountable on said base for enclosing a rotatable tool within said bowl, a removable cover for said bowl, a food-receiving hopper extending through the cover for feeding food items through the cover into the bowl to a tool rotatable by said tool drive means, and a food pusher manually insertable into said hopper for pushing the food items in said hopper toward the rotating tool, protective interlock apparatus comprising:
first magnetic means associated with the cover,
said first magnetic means becoming positioned in a predetermined position when the bowl is mounted on the base in proper position and when the cover is in proper position on the bowl,
second magnetic means in the base coupled with said control means for actuating said control means for rendering the tool drive operative only when said first magnetic means has become positioned in said predetermined position, and
discriminating means associated with said second magnetic means for preventing actuation of said control means except by the intended first magnetic means.
2. In a food processor, protective interlock apparatus as claimed in claim 1, in which:
said first magnetic means is first permanent magnet means having a plurality of permanently magnetized regions of alternate north, south, north, south polarity,
said second magnetic means is second permanent magnetic means, and
said discriminating means associated with said second magnetic means is a plurality of permanently magnetized regions of alternate north, south, north, south polarity which only become repelled by said regions of the first magnet means when the respective regions of the same polarity are aligned with each other in closely opposed relationship, thereby only producing actuation of said control means when such alignment has occurred.
3. In a food processor, protective interlock apparatus as claimed in claim 2, in which:
said plurality of permanently magnetized regions in said first permanent magnet means are antisymmetric in arrangement (NSNS), and
said plurality of permanently magnetized regions in said second permanent magnet means are antisymmetric in arrangement (NSNS),
whereby only at proper alignment of said first and second permanent magnet means does said second permanent magnet means become repelled by said first permanent magnet means.
4. In a food processor, protective interlock apparatus as claimed in claim 2 or 3, in which:
said plurality or permanently magnetized regions of alternate north, south, north, south polarity in said first permanent magnet means are a plurality of parallel zones of uniform width, and
said plurality of permanently magnetized regions of alternate north, south, north, south polarity in said second permanent magnet means are a plurality of parallel zones of uniform width each equal to the width of the respective corresponding zones of the first permanent magnet means.
5. In a food processor, protective interlock apparatus as claimed in claim 1, in which:
said second magnetic means includes a first ferromagnetic member in said base having two spaced end portions, means for inducing alternating magnetic flux of predetermined fixed frequency different from ordinary alternating current power line frequency and nearby harmonics in said first member and a pick-up winding coupled to said first member for having an alternating signal voltage induced therein, said pick-up winding being electrically connected to said control means for actuating said control means only when a signal voltage of significant magnitude is induced in said pick-up winding, said first magnetic means completes an essentially closed ferromagnetic flux path between said two spaced end portions of said first ferromagnetic member only when both said bowl and cover are in their respective proper operating positions on the base for causing a signal voltage of significant magnitude to be induced in said pick-up winding only when both said bowl and cover are properly positioned, and said discriminating means comprises means for rendering the control means only responsive to a signal voltage of said predetermined fixed frequency.

6. In a food processor, protective interlock apparatus as claimed in claim 5, in which:

said alternating magnetic flux has an ultrasonic frequency.

7. In a food processor, protective interlock apparatus as claimed in claim 5 or 6, in which:

said first magnetic means for completing said essentially closed ferromagnetic flux path between said two spaced end portions of said first ferromagnetic member include second and third ferromagnetic members extending vertically in said bowl, said second and third members being spaced apart and having their respective lower ends aligned with and closely adjacent to said two spaced end portions of said first member when the bowl is in proper position on the base, and a fourth ferromagnetic member associated with the cover and effectively bridging across between the respective upper ends of said second and third members when the cover is in proper position on the bowl.

8. In a food processor, protective interlock apparatus as claimed in claim 7, in which:

said first ferromagnetic member is generally H-shaped, said means for generating alternating flux in said H-shaped member includes a primary winding on one of the vertical legs of said H-shaped member, and said pick-up winding is on the cross bar of said H-shaped member.

9. In a food processor, protective interlock apparatus as claimed in claim 7, in which:

said first ferromagnetic member is generally H-shaped, said means for generating alternating flux in said H-shaped member includes a primary winding on the cross bar of said H-shaped member, and said pick-up winding is on one of the vertical legs of said H-shaped member.

10. In a food processor, protective interlock apparatus as claimed in claim 5 or 6, in which:

said first magnetic means for completing said essentially closed ferromagnetic flux path between said two spaced end portions of said first ferromagnetic member include second, third, fourth, fifth and sixth ferromagnetic members, said second and third members extending vertically in said bowl, said second and third members being spaced apart and having their respective lower ends aligned with and closely adjacent to said two spaced end portions of said first member when the bowl is in proper position on the base, said fourth and fifth ferromagnetic members extending upwardly in the cover and extending upwardly along opposite sides of said hopper, said fourth and fifth members having their respective lower ends aligned with and closely adjacent to the respective upper ends of said second and third members when the cover is in proper position on the bowl, and said sixth ferromagnetic member being associated with the food pusher and effectively bridging across between the respective upper portions of said fourth and fifth members when the food pusher is in proper position in the hopper.

11. In a food processor, protective interlock apparatus as claimed in claim 10, in which:

said first ferromagnetic member is generally H-shaped, said means for generating alternating flux in said H-shaped member includes a primary winding on one of the vertical legs of said H-shaped member, and said pick-up winding is on the cross bar of said H-shaped member.

12. In a food processor, protective interlock apparatus as claimed in claim 10, in which:

said first ferromagnetic member is generally H-shaped, said means for generating alternating flux in said H-shaped member includes a primary winding on the cross bar of said H-shaped member, and said pick-up winding is on one of the vertical legs of said H-shaped member.

13. In a food processor of the type including tool drive means located in a base housing with control means for rendering the tool drive inoperative unless said control means is actuated, a bowl mountable on said base for enclosing a rotatable tool within said bowl, a removable cover for said bowl, a food feed tube for feeding food items into the bowl to a tool rotatable by said tool drive means, and a food pusher manually insertable into said feed tube for pushing the food items in said feed tube toward the rotating tool, protective interlock apparatus comprising:

first permanent magnet means associated with the cover, said first permanent magnet means becoming positioned in a predetermined position when the bowl is mounted on the base in proper position and when the cover is in proper position on the bowl, second permanent magnet means in the base housing coupled with said control means for actuating said control means for rendering the tool drive operative only when said first permanent magnet means has become positioned in said predetermined position, and discriminating means associated with said second permanent magnet means for preventing actuation of said control means except by the intended first permanent magnet means.

14. In a food processor, protective interlock apparatus as claimed in claim 13, in which:

said discriminating means associated with said second permanent magnet means is a movable pivot mounting of said second permanent magnet means at its center, spring means urging said pivot mounting in a first direction, whereby said pivot mounting is moved in a second direction against the force of said spring means only when equally balanced repulsive forces are applied to opposite ends of the centrally pivoted second permanent means, and such equally balanced repulsive forces are applied thereto when said first permanent magnet means has become positioned in said predetermined position.

15. In a food processor, protective interlock apparatus as claimed in claim 13 or 14, in which:

said discriminating means associated with said second permanent magnet means includes a raised platform having a curved periphery on the upper surface of the base housing and includes the positioning of the opposite ends of said second permanent magnet means relatively far apart beneath the upper surface of the base housing close to curved periphery of said raised platform, whereby said curved periphery prevents any straight permanent magnet object from simultaneously being positioned near both ends of said second permanent magnet.

16. In a food processor, protective interlock apparatus as claimed in claim 13, in which:

said discriminating means associated with said second permanent magnet means includes:

a predetermined magnetic polarity pattern in said second permanent means, a spring-biased movable mounting for said second magnet means exerting force in a first direction, and said first permanent magnet means having a corresponding predetermined magnetic polarity pattern, whereby said second magnet means is only repelled and moved against the spring force when said first permanent magnet means becomes positioned in said predetermined position by proper bowl and cover positioning, thereby aligning its magnetic polarity pattern is registration with the polarity pattern of said second permanent magnet means for producing powerful repelling action between them.

17. In a food processor, protective interlock apparatus as claimed in claim 13, 14 or 16, in which:

said first permanent magnet means associated with the cover includes:

a first permanent magnet and a movable element supporting said first magnet, said movable element being mounted upon said bowl in a position to be aligned with said second permanent magnet means in said base housing when the bowl is properly positioned on the base housing, spring means for urging said first magnet away from the base housing, and said cover causing movement of said element against the spring force when the cover is properly positioned on the bowl for moving said first magnet near to the base housing for repelling said second permanent magnet means for actuating said control means for rendering the tool drive means operative.

18. In a food processor, protective interlock apparatus as claimed in claim 16, in which:

said predetermined magnetic polarity pattern in said first permanent magnet means is anti-symmetric, and said predetermined magnetic polarity pattern in said second permanent magnet means is a corresponding anti-symmetric pattern, whereby only at one predetermined relative position when said two anti-symmetric patterns are directly aligned does said powerful repelling action occur for moving said movable mounting for producing actuation of said control means.

19. In a food processor, protective interlock apparatus as claimed in claim 16 or 18, in which:

said first predetermined polarity pattern in said first permanent magnet means is a plurality of parallel strips of alternating polarity, and said second predetermined polarity pattern in said second permanent magnet means is a plurality of parallel stripes of alternating polarity each corresponding in width to the respective corresponding stripe in said first pattern.

20. In a food processor of the type including tool drive means located in a base with control means for rendering the tool drive inoperative unless said control means is actuated, a bowl mountable on said base for enclosing a rotatable tool within said bowl, a removable cover for said bowl, a food-receiving hopper for feeding food items into the bowl to a tool rotatable by said tool drive means, and a food pusher manually insertable into said hopper for pushing the food items in said hopper toward the rotating tool, and wherein an element movably mounted on the bowl is spring-biased in a direction away from the base, and proper positioning of the cover on the bowl causes said movable element to be moved toward the base, improved safety interlock apparatus which comprises:

a first permanent magnet carried by said movable element, a second element movably mounted in the base spring-biased toward the region toward which said first element is moved by said proper positioning of the cover on the bowl when the bowl is also in its proper position on the base, a second permanent magnet in the base carried by said second movable element, said second movable element being connected to said control means, and each of said magnets having a predetermined coded pattern of magnetic polarities, whereby the coded pattern of magnetic polarities of said magnets become aligned in registration with each other and said first magnet becomes moved toward the second magnet only when both the cover and bowl are in their respective operating positions, thereby repelling said second magnet by said first magnet for moving said second element against the spring bias for actuating said control means to render the tool drive operative, and whereby the coded pattern of said second magnet discriminates against repelling by an ordinary permanent magnet for preventing actuation of said control means by an ordinary magnet.

21. In a food processor as described in claim 20, wherein the bowl is properly mounted and secured in operating position upon the base by a twist-lock motion, the improved safety interlock apparatus as claimed in claim 20, in which:

said coded pattern comprises parallel stripes of alternate north, south, north, south, magnetic polarity, and said polarity stripes of each of said magnets are oriented perpendicular to the direction of twist-lock turning movement of the bowl as it is being properly mounted and secured upon the base, whereby orientation of said polarity stripes assures that the bowl is fully secured on the base before the tool drive is rendered operative, because only then does a forceful repelling action occur between said first and second magnets.

22. In a food processor, the improved safety interlock apparatus as claimed in claim 20 or 21, in which:

said second movable element is a lever of the second-class with said second magnet being mounted on the swingable end of said lever, and said lever has a pivoted fulcrum connected to a switch in said control means, said switch has a depressible spring-biased actuating button engaging an intermediate region of said lever, whereby said second magnet occupies a position on said lever having mechanical advantage for overcoming the spring-bias of said button for actuating the switch when the second magnet is repelled by the first magnet.

23. In a food processor, the improved safety interlock apparatus as claimed in claim 21, in which:

said coded pattern of parallel stripes of alternate polarity in each of said magnets is an anti-symmetric pattern corresponding to that of the other magnet, whereby only at 0° relative rotation of the two magnets with respect to each other does said forceful repelling action occur for rendering the tool drive operative.

24. In a food processor of the type including tool drive means located in a base with control means for rendering the tool drive inoperative unless said control means is actuated, a bowl mountable on said base for enclosing a rotatable tool within said bowl, a removable cover for said bowl, a food-receiving hopper extending through the cover for feeding food items through the cover into the bowl to a tool rotatable by said tool drive means, a food pusher manually insertable into said hopper for pushing the food items in said hopper toward the rotating tool, and wherein an element movably mounted on the bowl is spring-biased in a direction away from the base, and proper positioning of the cover on the bowl together with proper positioning of the food pusher into the hopper causes said movable element to be moved toward the base, improved safety interlock apparatus which comprises:

a first permanent magnet carried by said movable element, a second element movably mounted in the base spring-biased toward the region toward which said first element is moved by said proper positioning of the cover on the bowl when the bowl is also in its proper position on the base and when the food pusher has been inserted in the hopper, a second permanent magnet in the base carried by said second movable element, said second movable element being connected to said control means, and each of said magnets having a predetermined coded pattern of magnetic polarities, whereby the coded pattern of magnetic polarities of said magnets become aligned in registration with each other and said first magnet becomes moved toward the second magnet only when the cover and bowl and food pusher are all in their respective operating positions, thereby repelling said second magnet by said first magnet for moving said second element against the spring bias for actuating said control means to render the tool drive operative, and whereby the coded pattern of said second magnet discriminates against repelling by an ordinary permanent magnet for preventing actuation of said control means by an ordinary magnet.

25. In a food processor as described in claim 24, wherein the bowl is properly mounted and secured in operating position upon the base by a twist-lock motion, the improved safety interlock apparatus as claimed in claim 24, in which:

said coded pattern comprises parallel stripes of alternate north, south, north, south, magnetic polarity, and said polarity stripes of each of said magnets are oriented perpendicular to the direction of twist-lock turning movement of the bowl as it is being properly mounted and secured upon the base, whereby orientation of said polarity stripes assures that the bowl is fully secured on the base before the tool drive is rendered operative, because only then does a forceful repelling action occur between said first and second magnets.

26. In a food processor, the improved safety interlock apparatus as claimed in claim 24 or 25, in which:

said second movable element is a lever of the second-class with said second magent being mounted on the swingable end of said lever, and said lever has a pivoted fulcrum connected to a switch in said control means, said switch has a depressible spring-biased actuating button engaging an intermediate region of said lever, whereby said second magnet occupies a position on said lever having mechanical advantage for overcoming the spring-bias of said button for actuating the switch when the second magnet is repelled by the first magnet.

27. The method of operating a food processor of the type including tool drive means located in a base with control means for rendering the tool drive inoperative unless said control means is actuated, a bowl mountable on said base for enclosing a rotatable tool within said bowl, a removable cover for said bowl, a food-receiving feed tube extending through the cover for feeding food items through the cover into the bowl to a tool rotatable by said tool drive means, and a food pusher manually insertable into said feed tube for pushing the food items in said feed tube toward the rotating tool, said method preventing operation of the tool drive unless preselected manually removable components of the food processor have been properly placed in their respective operating positions comprising the steps of:

providing first and second permanent magnets having corresponding coded patterns of magnetic polarities, mounting said first coded magnet on one of said manually removable components in a predetermined association therewith for causing said first magnet to be brought into a predetermined region near the base only when said preselected components have been properly placed in their respective operating positions, movably mounting said second coded magnet in the base,
biasing said second coded magnet to move toward said predetermined region, and
connecting said movably mounted second coded magnet to said control means,
whereby said second coded magnet is repelled and moves against said biasing for actuating said control means for rendering the tool drive operative only when said first magnet has been brought into said predetermined region,
thereby assuring that said preselected components have been properly placed in their respective operating positions before the tool drive is rendered operative, and
thereby discriminating against the repelling of said second coded magnet by an ordinary magnet for avoiding actuation of said control means by an ordinary magnet.

28. The method of operating a food processor as described in claim 27, wherein the bowl is properly mounted and secured in operating position upon the base by a twist-lock motion, said method preventing operation of the tool drive unless preselected manually removable components have been properly placed in their respective operating positions as claimed in claim 27, including the additional steps of:
   providing a coded pattern in each magnet comprising parallel stripes of alternate north, south, north, south, etc. magnetic polarity, and
   orienting said polarity stripes of each of said magnets perpendicular to the direction of twist-lock turning movement of the bowl as it is being properly mounted and secured upon the base,
   whereby such orientation of said polarity stripes assures that the bowl is fully secured on the base before the tool drive is rendered operative, because only then does a forceful repelling action occur between said first and second coded magnets.

29. The protective interlock method in a food processor having tool drive means in a base with control means for preventing operation of the tool drive means unless said control means is actuated, a bowl mountable on said base for enclosing a rotatable tool within said bowl, a removable cover for said bowl, a food-receiving hopper for feeding food items into the bowl to a tool rotatable by said tool drive means, and a food pusher manually insertable into said hopper for pushing food items in said hopper toward the rotary tool, said protective interlock method characterized by the steps of:
   magnetically actuating said control means when the bowl is mounted on the base in proper position and the cover is also in proper position on the bowl, and discriminating against improper magnetic actuation of said control means.

30. The protective interlock method as claimed in claim 29, characterized by the steps of using permanent magnet actuation of said control means and arranging a permanent magnet for discriminating against improper magnetic actuation of said control means.

31. The protective interlock method as claimed in claim 30, characterized by the step of providing a coded magnetic pattern in a permanent magnet for discriminating against improper magnetic actuation of said control means.

32. In a food processor having tool drive means in a base with control means for preventing operation of the tool drive means unless said control means is actuated, a bowl mountable on said base for enclosing a rotatable tool within said bowl, a removable cover for said bowl, a food-receiving hopper extending through the cover for feeding food items through the cover into the bowl to a tool rotatable by said tool drive means, and a food pusher manually insertable into said hopper for pushing food items in said hopper toward the rotary tool, protective interlock apparatus comprising:
   a first magnetic means operatively associated with the bowl and cover and arranged to be in a predetermined position when the bowl and cover are both in their respective proper operating positions,
   second magnetic means in the base operatively associated with said control means for actuating said control means only when said first magnetic means is in said predetermined position as a result of both said bowl and cover being in their respective proper operating positions.

33. In a food processor, protective interlock apparatus as claimed in claim 32, in which:
   said first and second magnetic means are each coded for preventing actuation of said control means by other magnetic means.

* * * * *